(12) United States Patent
Williams

(10) Patent No.: US 9,079,480 B1
(45) Date of Patent: Jul. 14, 2015

(54) GLASS RUN WEATHER STRIP ASSEMBLY

(71) Applicant: Toyota Motor Engineering & Manufacturing North America, Inc., Erlanger, KY (US)

(72) Inventor: Paxton S. Williams, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/297,680

(22) Filed: Jun. 6, 2014

(51) Int. Cl.
*B60J 9/00* (2006.01)
*B60J 10/00* (2006.01)
*E06B 7/23* (2006.01)

(52) U.S. Cl.
CPC .......... *B60J 10/0014* (2013.01); *B60J 10/0002* (2013.01); *E06B 7/2301* (2013.01); *E06B 7/2314* (2013.01)

(58) Field of Classification Search
CPC . B60J 10/0002; B60J 10/0014; E06B 7/2301; E06B 7/2314
USPC .............. 49/440, 441; 296/146.9, 146.5, 1.08
See application file for complete search history.

(56) References Cited

U.S. PATENT DOCUMENTS

| | | | | |
|---|---|---|---|---|
| 3,742,649 A * | 7/1973 | Dochnahl | | 49/441 |
| 4,433,867 A * | 2/1984 | Perry et al. | | 296/146.9 |
| 4,567,691 A * | 2/1986 | Warner | | 49/374 |
| 4,649,668 A * | 3/1987 | Skillen et al. | | 49/374 |
| 4,800,681 A * | 1/1989 | Skillen et al. | | 49/440 |
| 5,228,740 A * | 7/1993 | Saltzman | | 296/146.1 |
| 5,317,835 A * | 6/1994 | Dupuy et al. | | 49/441 |
| 5,475,947 A * | 12/1995 | Dupuy | | 49/490.1 |
| 5,702,148 A * | 12/1997 | Vaughan et al. | | 296/146.9 |
| 6,205,712 B1 * | 3/2001 | Ellis | | 49/441 |
| 6,493,992 B2 | 12/2002 | Goto | | |
| 6,612,074 B1 * | 9/2003 | Kaye et al. | | 49/441 |
| 6,668,490 B2 * | 12/2003 | Hock et al. | | 49/502 |
| 7,159,926 B2 * | 1/2007 | Ward et al. | | 296/146.7 |
| 7,478,863 B2 * | 1/2009 | Krause | | 296/146.2 |
| 7,854,094 B2 * | 12/2010 | Zimmer et al. | | 49/440 |
| 8,205,389 B1 * | 6/2012 | Kesh | | 49/440 |
| 8,479,449 B2 * | 7/2013 | Titz | | 49/440 |
| 8,572,897 B2 | 11/2013 | Dishman et al. | | |
| 2005/0168009 A1 * | 8/2005 | Dry et al. | | 296/146.5 |
| 2007/0089371 A1 * | 4/2007 | Krause | | 49/441 |
| 2010/0064591 A1 * | 3/2010 | Iwabuchi | | 49/499.1 |
| 2010/0115851 A1 * | 5/2010 | Nakao et al. | | 49/502 |
| 2012/0091746 A1 | 4/2012 | Zimmer et al. | | |
| 2012/0091751 A1 | 4/2012 | Zimmer et al. | | |
| 2012/0267914 A1 * | 10/2012 | Thiele et al. | | 296/146.9 |
| 2013/0127196 A1 | 5/2013 | Takeuchi et al. | | |
| 2013/0160374 A1 * | 6/2013 | Kuwabara et al. | | 49/440 |

FOREIGN PATENT DOCUMENTS

| | | | | |
|---|---|---|---|---|
| FR | 2696377 A1 * | 4/1994 | | B60J 10/04 |
| JP | 03042331 A * | 2/1991 | | B60J 10/04 |

* cited by examiner

*Primary Examiner* — Jerry Redman
(74) *Attorney, Agent, or Firm* — Christopher G. Darrow; The Darrow Law Firm PC

(57) ABSTRACT

Embodiments of glass run weather strips and door assemblies are described herein. Such assemblies may include a door frame defining a window opening and a window moveable between an open and closed position. A weather strip may be attached to the door frame such that a portion of the window is in contact with the weather strip and an interior garnish may be installed such that a garnish pin extends into an aperture in the weather strip.

17 Claims, 3 Drawing Sheets

GLASS RUN WEATHER STRIP ASSEMBLY

BACKGROUND OF THE DISCLOSURE

The present disclosure relates to automobile weather strip assemblies, and more particularly to glass run weather strip assemblies that prevent migration of the weather strip.

Weather strips have been used extensively aboard automobiles around vehicle doors and windows. Weather strips may serve many useful purposes including noise, vibration, and harness (NVH) absorption and creating a seal around vehicle components that resists external elements such as moisture. Weather strips may be used within glass run channels in a vehicle door to form a seal around automobile windows that are configured to travel from a closed position to open positions. Movement of a window may impart forces upon the weather strip and may cause migration of the weather strip in relation to the glass run channel.

SUMMARY OF THE DISCLOSURE

Embodiments of glass run weather strip assemblies to prevent weather strip migration are described herein. Assemblies may include weather strips configured to attach to a portion of a door frame. The weather strip may also include a hole in a corner connection that may receive a garnish pin located on an interior garnish component when in the installed position. The weather strip may be retained by the garnish pin and therefore reduce or resist weather strip migration from frictional forces applied by a moving window.

In one implementation, a glass run weather strip assembly may comprise a door frame at least partially defining a window opening, a weather strip comprising a weather strip aperture, the weather strip configured to attach to the door frame and contact a window, and an interior garnish comprising a garnish pin, wherein the interior garnish is configured to attach to the door frame and the garnish pin is configured to at least partially extend through the weather strip aperture.

In another implementation, a door assembly may comprise a door frame at least partially defining a window opening, a window moveable between an open and closed position within the window opening, a weather strip attached to the door frame configured to contact the window, the weather strip comprising a weather strip aperture, and an interior garnish comprising a garnish pin configured to at least partially extend through the weather strip aperture.

In yet another implementation, a door assembly may comprise a door frame defining a window opening and having two frame flanges extending towards the window opening together defining a substantially open and hollow cross-section and a glass window moveable between an open and closed position. The assembly may further comprise a weather strip comprising at least one flange clamping section, at least one sealing member, and at least one aperture defined therein, wherein the at least one flange clamping section receives the at least one door frame flange, the at least one sealing member is configured to contact a portion of the window, and an interior garnish comprising a garnish pin and a garnish clip, wherein the garnish pin is configured to engage and at least partially extend through the weather strip aperture and the garnish clip is configured to engage an aperture defined in the door frame such that a portion of the garnish overlaps an edge of the weather strip.

The foregoing features and elements may be combined in various combinations without exclusivity unless expressly indicated otherwise. These features and elements as well as the operation thereof will become more apparent in light of the following description and the accompanying drawings. It should be appreciated, however, that the following description and drawings are intended to be exemplary in nature and non-limiting.

BRIEF DESCRIPTION OF THE DRAWINGS

The description herein makes reference to the accompanying drawings wherein like reference numerals refer to like parts throughout the several views, and wherein.

DETAILED DESCRIPTION

Described herein are glass run weather strip assemblies that may resist or prevent the migration of weather stripping around a vehicle door window. In some embodiments, weather strips are attached to a door frame surrounding a window opening. The weather strip may clamp around portions of the door frame and the weather strip may include at least one aperture. An interior garnish may be attached to the door frame such that a garnish pin extends into the aperture located in the weather strip. The interaction of the garnish pin and weather strip aperture may prevent or reduce the migration of the weather strip during opening or closing operations of a window within the window opening.

Figure 1:
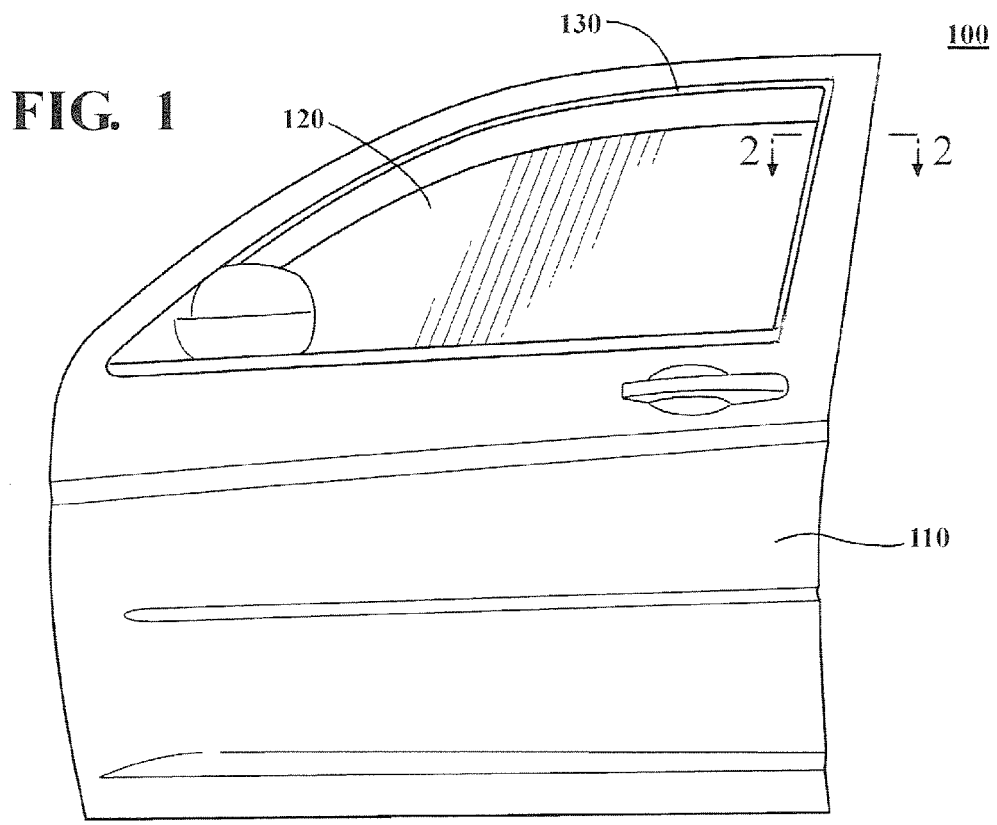
FIG. 1 shows a perspective view of a door assembly for a vehicle.

FIG. 1 shows one embodiment of a vehicle door assembly 100. Door assembly 100 generally may include door frame 110, window glass 120, and weather strip 130.

In some embodiments, door assembly 100 may include a door frame 110 that provides structural support for door components. In the example of FIG. 1, frame 110 may extend around and partially define a window opening in door assembly 100.

Figure 2:
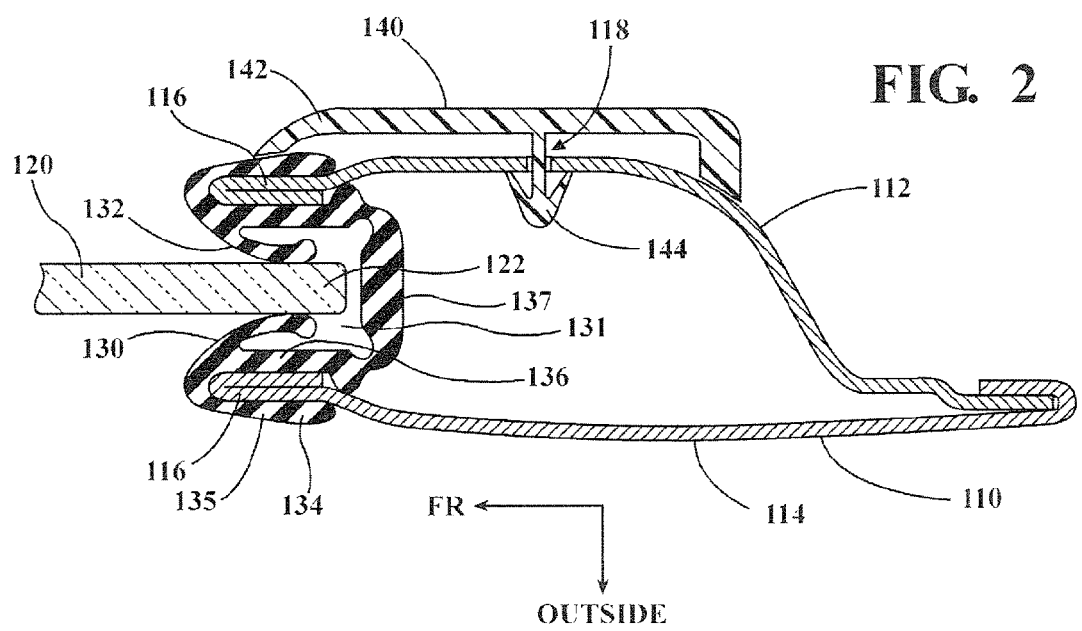
FIG. 2 shows a cross sectional view of the door assembly of FIG. 1 along view 2-2.

FIG. 2 shows a cross sectional view of a portion of door assembly 100 at the line 2-2 of FIG. 1. Door frame 110 may be formed of stamped sheet metal having a cross sectional shape as shown. Door frame 110 may include inner frame 112 and outer frame 114. In some embodiments, door assembly 100 may be a press type door, where inner and outer frames 112/114 of door frame 110 extend continuously around the window opening. Door frame 110 may include one or more frame flanges 116 that project inwards towards the window opening. For example, frame 110 may have frame flange 116 on each of the inner frame 112 and outer frame 114 extending substantially parallel to each other. Frame 110 may define an open and hollow cross section as shown in FIG. 2. The thickness of door frame 110 may be uniform throughout, or certain portions may be thicker to provide extra support or strength to door frame 110.

In some embodiments, window 120 may be included in door assembly 100 and may be operable to move between an open and closed position. For example, window 120 may move vertically in the orientation of FIG. 1. The closed position may be defined where window 120 substantially fills the window opening, and the open position may be defined where window 120 is displaced away from the window opening. Window 120 may be configured to be positioned in several positions between fully closed and fully opened and may be operable either through mechanical or electrical activation. Window 120 may be attached to a window actuator (not shown) within door assembly 100 that may move window 120 within a glass run channel defined by weather strip 130 and door frame 110. Window 120 may be made out of a variety of rigid and transparent materials such as glass and plastic.

In some embodiments, weather strip 130 may be included in door assembly 100 to create a partial seal around window 120. Weather strip 130 may prevent or reduce moisture from entering door assembly 100 when window 120 is in a closed position and may also provide sound and temperature insulation. Weather strip 130 may be installed to attach to door frame 110 around the window opening as shown in FIG. 1. For example, weather strip 130 may be present around the sides and top of the window opening.

Referring to FIG. 2, weather strip 130 may define a window cavity 131 as shown by the cross sectional view. For example, a window edge 122 of window 120 may partially extend into window cavity 131 in areas of weather strip 130 where window 120 is present.

Weather strip 130 may include one or more sealing members 132 to create a partial seal between weather strip 130 and window 120. Sealing members 132 may extend towards and contact one or more surfaces of window 120. For example, sealing members 132 may protrude at an angle towards the center of window cavity 131 and away from the window opening. Sealing members 132 may be resiliently biased towards a center position such that when window 120 is present within window cavity 131 of weather strip 130 sealing members 132 contact window 120 and are displaced slightly outward from the center of window cavity 131.

In some embodiments, weather strip 130 may include clamping members 134 to facilitate retention to door frame 110. For example, clamping members 134 may include a first branch 135 and a second branch 136 that together define a substantially "U-shaped" cross section as shown in FIG. 2. The clamping section may contact two sides of frame flange 116. First branch 135 may be resiliently biased towards second branch 136. In some embodiments, sealing members 132 may extend from a portion of weather strip 130 near where first and second branches 135/136 meet.

In some embodiments, weather strip 130 may include a base 137 that extends along the outside of window cavity 131 and is located between two clamping members 134. As shown in FIG. 2, door frame 110 may not have interior structure that is located near base 137 of weather strip 130. Thus, base 137 of weather strip 130 may not include any structure to engage portions of door frame 110.

In some embodiments, weather strip 130 may be formed from a variety of natural or synthetic materials. For example, weather strip 130 may be a thermoplastic elastomer (TPE) such as thermoplastic vulcanisate (TPV). TPV materials may give consistent and predictable performance, extended durability, and light and moisture resistance. TPV may include less rubber content than other materials, such as ethylene propylene diene monomer rubbers (EPDM), and as a result may not grip metal surfaces such as frame flange 116 as well.

Door assembly 100 may also include interior garnish 140 (see FIG. 2) located near the window opening on the interior side of door assembly 100. Garnish 140 may include garnish end 142 that extends beyond and covers from view the seam between weather strip 130 and frame 110. Garnish 140 may create an aesthetic appearance around the window as viewed from the interior of the vehicle. In some embodiments, garnish 140 may be attached to frame 110 via a garnish clip 144. For example, garnish clip 144 may pass through a frame aperture 118 in inner frame 112 of door frame 110. Garnish 140 may be formed from several different natural or synthetic materials, such as wood or plastic.

Figure 3:
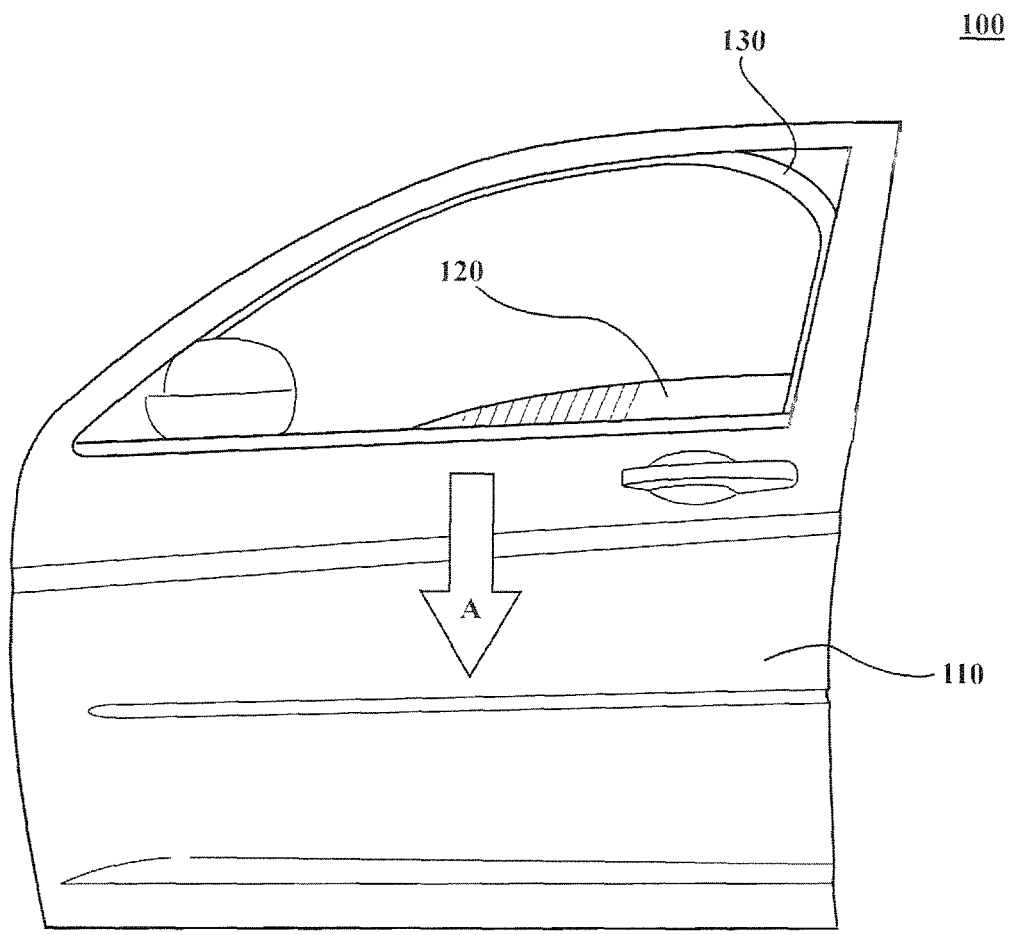
FIG. 3 shows a perspective view of a door assembly for a vehicle with weather strip migration.

FIG. 3 shows a perspective view of door assembly 100 with weather strip 130 that has migrated away from its installed position upon movement of window 120. For example, window 120 may have been moved in the direction of arrow A. This movement of window 120 relative to weather strip 130 may impart frictional forces upon weather strip 130. For example, a frictional force may be created from the contact of window 120 and sealing members 132 in the direction of travel of window 120. Such forces may cause weather strip 130 to migrate from its original location. The clamping and frictional forces between the flange clamping portions of weather strip 130 and the frame flanges 116 may not be strong enough to prevent weather strip 130 migration during window operations.

Figure 4:
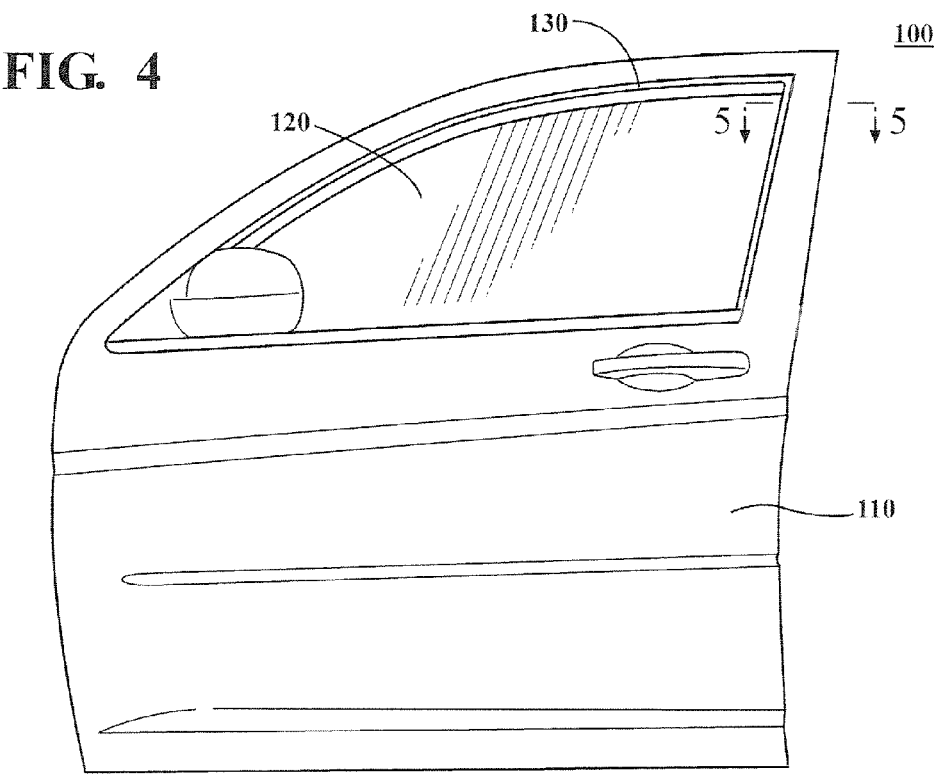
FIG. 4 shows perspective view of another embodiment of a door assembly for a vehicle.
Figure 5:
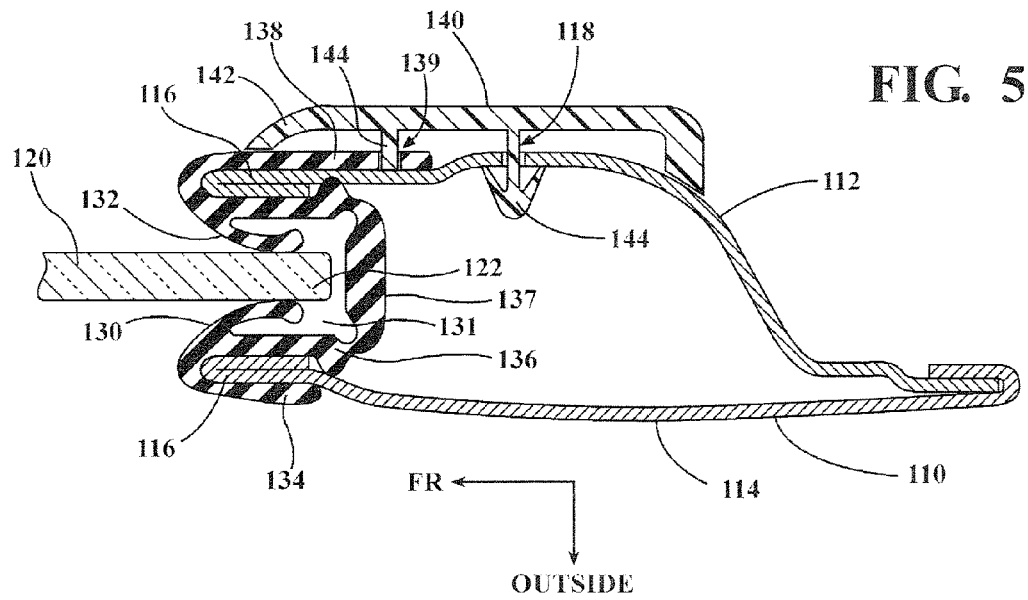
FIG. 5 shows a cross sectional view of the door assembly of FIG. 5 along view 5-5.

Referring now to FIGS. 4 and 5, embodiments of door assembly 100 are shown to prevent or reduce weather strip 130 migration during window use. In some embodiments, door assembly 100 may include garnish 140 configured to assist in retaining weather strip 130.

In some embodiments, weather strip 130 may include aperture 139 formed in an inner first branch 138 of clamping portion 134 as shown in the cross sectional view of FIG. 5. Inner first branch 138 may inwardly extend a distance greater than the first branch 135 of an outer clamping portion. Aperture 139 may be a circular hole extending through the inner first branch 138, but a variety of shapes and dimensions are contemplated. Weather strip 130 may include a single aperture 139, or multiple apertures 139 spaced from one another. For example, weather strip 130 may include a single aperture 139 located near an upper corner of the window opening of door assembly 100.

Garnish 140 may include an integrally formed garnish pin 144. Garnish pin 144 may extend towards door frame 110 substantially perpendicular to an inside surface of garnish 140. Garnish pin 144 may be located and configured to extend at least partially into aperture 139 of weather strip 130 when garnish 140 and weather strip 130 are in their installed positions. For example, garnish pin 144 may be cylindrical in shape, with dimensions close to those of aperture 139. Garnish pin 144 may include a pin end that sits in abutment with a surface of inner frame 112.

Embodiments described herein allow for garnish 140 to assist in reducing or preventing weather strip 130 migration during window movement. For example, if weather strip 130 receives frictional forces during window 120 movement, aperture 139 surfaces may contact garnish pin 144. Weather strip 130 may receive forces from garnish pin 144 that resist movement of weather strip 130, as garnish pin 144 may be substantially fixed and rigid. This interaction between weather strip aperture 139 and garnish pin 144 may prevent or reduce displacement or migration of weather strip 130.

In these embodiments, door frame 110 need not be modified to include mounting structure near base 137 of weather strip 130, nor does weather strip 130 need to include mounting fasteners such as pins or clips.

The weather strip assembly of door assembly 100 may be installed by first attaching weather strip 130 to door frame 110 such that clamping members 134 receive frame flanges 116. Garnish 140 may attached to door frame 110 through insertion of garnish clip 144 into frame aperture 118 and through insertion of garnish pin 144 into weather strip aperture 139.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A glass run weather strip assembly, comprising:
   a door frame at least partially defining a window opening and at least one clip aperture extending through the door frame;
   a weather strip defining a weather strip aperture extending through the weather strip, the weather strip configured to attach to the door frame and contact a window;
   an interior garnish comprising a garnish pin at least partially extending only through the weather strip aperture, and a garnish clip extending only through the clip aperture; and wherein the weather strip aperture and the at least one clip aperture are separate and distinct.

2. The weather strip assembly of claim 1, wherein the weather strip aperture is located proximate an upper corner of the window opening in an installed position.

3. The weather strip assembly of claim 1, wherein the door frame comprises at least one frame flange at a perimeter of the window opening.

4. The weather strip assembly of claim 3, wherein the door frame comprises two frame flanges extending towards the window opening, the door frame defining a substantially open and hollow cross-section.

5. The weather strip assembly of claim 3, wherein the weather strip comprises at least one flange clamping section configured to receive the at least one frame flange.

6. The weather strip assembly of claim 5, wherein the flange clamping section comprises a first branch and a second branch together defining a substantially U-shaped cross section configured to contact two sides of the at least one frame flange.

7. The weather strip assembly of claim 1, wherein the weather strip comprises at least one sealing member to contact a surface of the window.

8. The weather strip assembly of claim 1, wherein the weather strip is made of a thermoplastic elastomer (TPE).

9. The weather strip assembly of claim 8, wherein the TPE is a thermoplastic vulcanisate (TPV).

10. A door assembly, comprising:
    a door frame at least partially defining a window opening and at least one clip aperture extending through the door frame;
    a window moveable between an open and closed position within the window opening;
    a weather strip attached to the door frame and configured to contact the window, the weather strip defining a weather strip aperture extending through the weather strip;
    an interior garnish comprising a garnish pin configured to at least partially extend through only the weather strip aperture, and a garnish clip configured to at least partially extend through only the clip aperture,
    wherein the garnish pin and the garnish clip outwardly extend a distance away from the interior garnish in substantially parallel directions; and wherein the weather strip aperture and the at least one clip aperture are separate and distinct.

11. The door assembly of claim 10, wherein the door frame comprises two frame flanges extending towards the window opening and the door frame defines a substantially open and hollow cross-section.

12. The door assembly of claim 11, wherein the weather strip comprises at least one flange clamping section configured to receive the at least one frame flange.

13. The weather strip assembly of claim 12, wherein the flange clamping section comprises a first branch and a second branch together defining a substantially U-shaped cross section configured to contact two sides of the at least one frame flange.

14. The door assembly of claim 10, wherein the weather strip is made of a thermoplastic elastomer (TPE).

15. The door assembly of claim 14, wherein the TPE is a thermoplastic vulcanisate (TPV).

16. The door assembly of claim 10, wherein the weather strip aperture is located proximate an upper corner of the window opening in an installed position.

17. A door assembly, comprising:
    a door frame defining a window opening and having two frame flanges extending towards the window opening, the door frame defining a substantially open and hollow cross-section and having an aperture extending through the door frame;
    a glass window moveable between an open and closed position;
    a weather strip comprising a pair of flange clamping sections, at least one sealing member, and at least one aperture extending through the weather strip, wherein the flange clamping sections receive the door frame flanges, the at least one sealing member is configured to contact a portion of the window; and
    an interior garnish comprising a garnish pin and a garnish clip, wherein the garnish pin is configured to at least partially extend through only the weather strip aperture and the garnish clip is configured to extend through only the aperture defined in the door frame such that a portion of the garnish overlaps an edge of the weather strip; and wherein the weather strip aperture and the at least one clip aperture are separate and distinct.

* * * * *